United States Patent
Mazyck

(10) Patent No.: US 7,879,136 B2
(45) Date of Patent: Feb. 1, 2011

(54) MAGNETIC ACTIVATED CARBON AND THE REMOVAL OF CONTAMINANTS FROM FLUID STREAMS

(75) Inventor: David W. Mazyck, Gainesville, FL (US)

(73) Assignee: Engineering Performance Solutions, LLC, Gainsville, FL (US)

(*) Notice: Subject to any disclaimer, the term of this patent is extended or adjusted under 35 U.S.C. 154(b) by 169 days.

(21) Appl. No.: 12/049,814

(22) Filed: Mar. 17, 2008

(65) Prior Publication Data

US 2008/0226523 A1 Sep. 18, 2008

Related U.S. Application Data

(63) Continuation of application No. 10/541,847, filed as application No. PCT/US2004/000615 on Jan. 12, 2004, now abandoned.

(60) Provisional application No. 60/439,429, filed on Jan. 13, 2003.

(51) Int. Cl.
- *B01D 53/10* (2006.01)
- *B01D 53/86* (2006.01)
- *B01J 20/06* (2006.01)
- *B01J 20/20* (2006.01)

(52) U.S. Cl. .............. 95/27; 95/134; 95/901; 96/153; 502/417; 502/421

(58) Field of Classification Search .......... 95/27, 95/90, 107–108, 134, 901; 96/123, 150, 96/153; 110/203, 217, 345; 502/416–418, 502/421, 349, 350, 352; 423/210
See application file for complete search history.

(56) References Cited

U.S. PATENT DOCUMENTS

| | | | |
|---|---|---|---|
| 1,789,507 A * | 1/1931 | Aarts | 502/404 |
| 3,803,033 A | 4/1974 | Sutherland | |
| 4,201,831 A | 5/1980 | Slusarczuk et al. | |
| 4,260,523 A | 4/1981 | Tsukamoto et al. | |
| 5,875,384 A | 2/1999 | Peill et al. | |
| 6,258,334 B1 | 7/2001 | Gadkaree et al. | |
| 6,914,034 B2 | 7/2005 | Vo | |
| 7,429,330 B2 | 9/2008 | Vo et al. | |
| 7,722,843 B1 * | 5/2010 | Srinivasachar | 423/210 |
| 2002/0066368 A1 | 6/2002 | Zornes | |
| 2002/0124725 A1 | 9/2002 | Chang et al. | |
| 2004/0147397 A1 * | 7/2004 | Miller et al. | 502/406 |

FOREIGN PATENT DOCUMENTS

| | | |
|---|---|---|
| WO | WO 95/11749 A | 5/1995 |
| WO | WO 99/48811 * | 9/1999 |
| WO | WO 02/24332 A | 3/2002 |
| WO | WO 02/069351 A1 | 9/2002 |

OTHER PUBLICATIONS

Patent Abstract of Japan, vol. 017, No. 638, Nov. 26, 1993 (corresponds to JP 5-200224 A).

* cited by examiner

*Primary Examiner*—Frank M Lawrence
(74) *Attorney, Agent, or Firm*—Sughrue Mion, PLLC

(57) ABSTRACT

Magnetic activated carbon and the removal of contaminants from a fluid stream using the magnetic activated carbon is described. The magnetic activated carbon is preferably magnetic powdered activated carbon and may contain titania. The magnetic activated carbon may be used to remove contaminants such as mercury from fluid streams including flue gases from a combustion plant.

28 Claims, 5 Drawing Sheets

MAGNETIC ACTIVATED CARBON AND THE REMOVAL OF CONTAMINANTS FROM FLUID STREAMS

This is a continuation of application Ser. No. 10/541,847 filed Jul. 12, 2005 (abandoned), which was the National Stage of International Application No. PCT/US2004/000615 filed Jan. 12, 2004 claiming benefit pursuant to 35 U.S.C. §119(e)(1) of the filing date of U.S. Provisional Application No. 60/439,429 filed Jan. 13, 2003; the entire disclosures of the prior applications is incorporated herein by reference.

BACKGROUND OF THE INVENTION

1. Field of the Invention

This invention is directed to activated carbon for purifying flue gas, which can be separated magnetically from fly ash and, more specifically, magnetic powdered activated carbon (MPAC) having an enhanced affinity for flue gas constituents such as Hg, the iron on the surface of the carbon catalyzing the oxidation of elemental Hg. The present invention also relates to further enhancing Hg capture by using a photocatalyst (e.g., $TiO_2$, $ZnO$, $SnO_2$) that may be added to the carbon's surface which when irradiated with UV light creates hydroxyl radicals. The hydroxyl radicals oxidize elemental Hg which adsorbs more readily than elemental Hg.

2. Description of the Related Prior Art

Amongst the numerous hazardous air pollutants (HAPs) currently regulated by the EPA, elemental mercury and mercury containing compounds have recently been highlighted as significant due to their increasing rate of release, and the lack of adequate control technologies. Although the resulting quantity in the environment is usually low, it can transfer to various organisms, and then magnify up the food chain. For example, the concentration of accumulated mercury in some fish can reach levels that are millions of times greater than that in the water. The consumption of such fish by humans, and the resulting buildup of mercury in various tissues may lead to serious neurological and developmental effects such as losses of sensory or cognitive ability, tremors, inability to walk, convulsions, and even death. Methylmercury, the most common form of organic mercury, is almost completely incorporated into the blood stream, and can be transferred through the placenta and into all of the tissues of the fetus, including that of the brain. Because of the health concerns related to eating mercury contaminated fish, bans on fishing in certain regions such as in the Great Lakes have resulted in considerable losses to the economy.

The EPA has estimated that nearly 87% of the anthropogenic mercury emissions are from sources such as waste (as in waste-to-energy facilities) and fossil fuel combustion (as in coal-fired power plants). Recognizing this, control technologies have been employed in an effort to capture and dispose of the mercury found in combustion exhaust gases. Currently, powdered activated carbon (PAC) injection into the flue gas stream is the best available control technology for mercury removal. However, understanding that an estimated 3 kg of activated carbon is needed to remove 1 g of mercury, to meet regulations it is anticipated that PAC injection will cost between $2 and $5 billion annually. Furthermore, PAC's low mercury adsorption efficiency, low applicable temperature range, slow adsorption rate, and lack of adequate regeneration technologies, all have sparked an interest in modifying the material to either decrease costs or improve uptake in hopes for optimization.

Another shortcoming in using PAC injection systems is the accumulation of the waste PAC in the fly ash. Fly ash, the fine particulate fraction of the Coal Combustion Byproducts (CCBs) (i.e., noncombustible inorganics and uncombusted carbon), is collected from flue gas and then commonly sold for the production of concrete and other materials. By using fly ash instead of the lime, cement, or crushed stone materials that are typically used, energy and resources are conserved. However, when the typical fly ash collection devices are coupled with PAC injection systems, the quality of the collected fly ash deteriorates because of the large fraction of carbon in the ash; consequently, revenue generation by selling the fly ash becomes impossible. Current research geared towards separation technologies has yet to find an adequate method to isolate the PAC from the fly ash. Therefore, a method that can easily separate PAC from the fly ash offers the potential to (a) maintain the quality of the fly ash for subsequent use, (b) reuse the PAC, and (c) recover the Hg for various applications.

SUMMARY OF THE INVENTION

In accordance with the present invention, there is provided a method for removing a contaminant or contaminants from a fluid stream. The method includes contacting the fluid stream with a composite of activated carbon and a magnetic material whereby the contaminant is adsorbed on the magnetized activated carbon, and removing the magnetized activated carbon having the mercury adsorbed thereon from the fluid stream. Preferably, the contaminant is mercury, and the composite preferably further comprises titania.

The method of the present invention preferably includes further the step of recycling the magnetized activated carbon removed from the fluid stream back into contact with the fluid stream, the fluid stream preferably being flue gas from a combustion plant, more preferably, a coal combustion plant or a waste combustion plant, wherein the activated carbon is preferably injected into the fluid stream.

The present invention also includes a composite of activated carbon and a magnetic material. The composite preferably further includes a photocatalyst. The activated carbon is preferably powdered activated carbon, and the magnetic material is preferably either magnetite, maghemite, hematite or goethite.

DETAILED DESCRIPTION OF THE PREFERRED EMBODIMENTS

Figure 1:
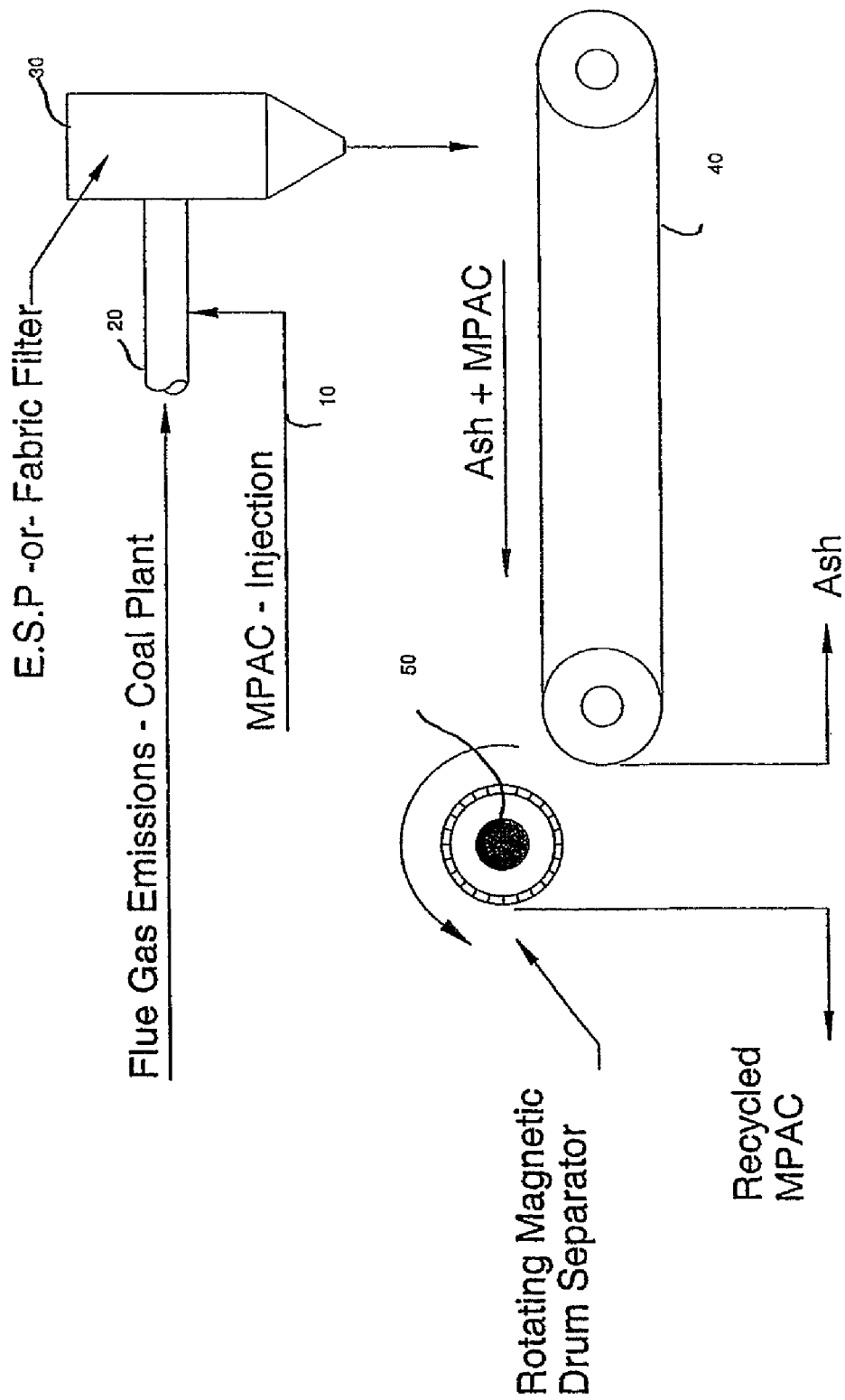
FIG. 1 represents a schematic summarizing the steps of injecting, capturing, and recycling the MPAC in accordance with the present invention.

The challenge of separating the PAC fraction from the fly ash is addressed by engineering magnetic PAC (MPAC) through iron impregnation/precipitation into the carbon's porous matrix or on its surface. The magnetic PAC particles, after cycling through the flue gas, can be collected, for example, by a magnetic drum before it accumulates with other particulate matter. Not only will this allow for separation of the MPAC and hence use of the fly ash for concrete production, it will also provide a method by which the MPAC composite can be recycled. Because of the short contact time between the flue gas and the carbon particle (mere seconds), only a fraction of the carbon's surface is actually utilized in removing mercury. Recycling the MPAC to fully exploit its adsorption capacity before disposal offers a plausible means to decrease the mass of PAC that would be required on an annual basis to meet regulations. Eventually, the adsorption capability of the MPAC in accordance with the present invention, may become diminished in which case it will be recognized that the MPAC could then be replaced with fresh MPAC. In any event, in addition, iron, (e.g., $Fe_2O_3$) can oxidize mercury (e.g., to HgO), which not only adsorbs better, but it itself serves as a sorption site for elemental Hg. Therefore, the efficacy for the recycled MPAC to perform even better than its first time use is very real. In other words, Hg captured during the second cycle could exceed Hg captured during the first time use. If so desired, prior to reinjection of the MPAC, the sorbed Hg could be recovered thermally or chemically by conventional technologies, as would be appreciated by one of ordinary skill in the art. In summary, the MPAC composite in itself will promote conservation of resources and a significant reduction in expenditures.

In a preferred embodiment of the present invention, the MPAC is coated with titanium dioxide ($TiO_2$) which provides for even greater Hg capture. Hydroxyl radicals, which are very powerful oxidants, can be generated on the surface of $TiO_2$ under UV radiation which enhances mercury uptake by oxidizing elemental Hg. Thus, adsorption increases with each exhaustion/UV-enhanced regeneration cycle. In other words, oxidized Hg (e.g., HgO) serves as sorption sites for elemental Hg. Therefore, oxidation of elemental mercury in accordance with the present invention and with titania and UV increases the mercury uptake over the reinjection cycles. In the case where electrostatic precipitators are installed in coal-fired power plants, the energy required to excite titania's electrons which leads to hydroxyl radical formation is present. For bag house installations, UV lamps near about 365 nm would be required. Thus, when a photocatalyst is incorporated into the MPAC in accordance with the present invention as will be discussed in more detail below, hydroxyl radicals are suitably provided on the surface of the photocatalyst by exposing the photocatalyst to excitation energy in the form of, for example, UV radiation or electrostatic energy. As would be recognized by one of ordinary skill in the art, UV radiation includes invisible radiation wavelengths from about 4 nanometers, on the border of the x-ray region, to about 380 nanometers, just beyond the violet in the visible spectrum.

In accordance with the present invention, activated carbon/iron composites are prepared by dispersing iron salts in deionized water already containing a slurry of powdered activated carbon. When followed by NaOH addition, chemical precipitation occurs implanting the iron on to and in the pores of the activated carbon. Preferably, a combination of salts are used to prepare the composite in accordance with the invention. However, it will be understood that the use of one iron salt is within the scope of the invention. The iron salts are preferably a combination of $FeCl_3$ (ferric chloride) and $FeSO_4$ (ferric sulfate) because they are inexpensive, and can be added in various ratios (i.e., about 1:99 to about 99:1) to achieve the desired magnetic species (e.g., magnetite ($Fe_3O_4$), maghemite ($\gamma$-$Fe_2O_3$), hematite ($\alpha$-$Fe_2O_3$), and goethite ($\alpha$-FeO(OH))). (Unless otherwise noted, all ratios expressed herein are weight ratios.) Other iron salts and magnetic species suitable for use in the present invention will be apparent to one skilled in the art. Preferably, the weight ratio of chloride salt to sulfate salt is greater than about 1:1, most preferably about a 2:1 ratio of $FeCl_3$ to $FeSO_4$. In some situations, however, a ratio of chloride salt to sulfate salt of greater than about 3:1 may be desired, as would be appreciated by one of ordinary skill in the art, such as when one desires to increase the chloride loading on the carbon surface since chloride is known to chemically bond mercury.

To achieve a desired activated carbon/iron composite ratio in accordance with the invention, activated carbon may be added by adjusting its weight in order to obtain activated carbon/iron oxide weight ratios of preferably less than about 5:1, more preferably less than about 4:1, even more preferably less than about 3:1, and most preferably an activated carbon/iron oxide weight ratio of about 1:1. For example, a composite in accordance with the present invention may be suitably prepared by the addition in solution of $FeCl_3$, $FeSO_4$ and activated carbon. The carbon and iron solution may then be mechanically mixed, and then NaOH added dropwise to increase pH to a level whereby the iron oxides precipitate. The material may then be dried. It will be recognized that heating at high temperatures (i.e., greater than about 150° C.) in inert environments or reducing environments can enhance magnetite formation. It is within the scope of this invention to realize that iron in its variety of forms and chemical formulas could also be added to the carbon via chelation or vapor phase adsorption.

Titania and other photocatalysts (e.g., ZnO, $SnO_2$) are well known for creating hydroxyl radicals (OH.) when irradiated with UV light. These OH radicals are strong oxidizing species that can oxidize organic and inorganic compounds. Although this is well known, there is no evidence currently available that describes the benefits of adding titania to a magnetic carbon composite. The titania (available as titania precursors (e.g., titania isopropoxide) or nano-sized titania (e.g., P-25 by Degussa)) or other photocatalyst may be added to the magnetic carbon composite in accordance with the present invention via boil deposition, hydrolysis, mechanofusion, or sol gel methods. For example, during the boil deposition procedure, the activated carbon may be mixed with the titania while the water is driven off through evaporation. To achieve a 1% titania weight loading (based upon the total weight of the titania and activated carbon), for example, about 100 mg of activated carbon may be mixed with about 1% by weight titania. Preferably, the titania loading is less than about 10% by weight, more preferably less than about 7% by weight, and most preferably less than about 5% by weight, based upon the total weight of the titania and MPAC, to avoid blocking adsorption sites.

It will be appreciated that while the present invention is described in connection with the removal of mercury from flue gas, the present invention is not limited to the removal of mercury from flue gas and may be used to remove other materials, specifically, contaminants such as, for example, sulfur and nitrogen containing compounds, VOCs (volatile organic compounds), and SOCs (synthetic organic chemicals) as defined by the Environmental Protection Agency, can be removed from fluid streams by the process in accordance with the present invention. Further, the present invention is described here in connection with the use of PAC. However, it will be understood that the use of granular activated carbon is also within the scope of the present invention.

In addition, by the term "composite" as used herein, is meant a complex material or a composition of material in which the activated carbon and magnetic material combine to produce a material with properties that are not present in either the activated carbon or magnetic material alone. While not wishing to be bound by theory, it is believed that there may become chemical or physical bonds such as, for example, Van der Waals forces, that bond the activated carbon and magnetic material. In any event, by the term "activated carbon" as used herein, is meant powdered or granular carbon used for purifying by adsorption. Also, by the term "PAC" or "powdered activated carbon" is meant activated carbon 90% of which passes through a 325-mesh sieve (45 μm).

Referring now to FIG. 1, there is shown schematically a coal fired plant operated in accordance with the present invention. Indeed, every coal-fired power plant is different, with this difference primarily depending upon the plant's capacity rating. In, for example, a coal-fired power plant (approximately 300 MW), with flue gas temperatures around 270° F. and a volumetric flow rate of approximately 1 million acfm (actual cubic feet per minute), the magnetic PAC particles 10, instead of PAC, are injected into the flue gas 20 at a rate of about 10 lb/hr to about 100 lb/hr, which depends upon the flue gas composition and temperature as well as the effluent mercury target, just upstream of the existing air pollution control device (APCD) 30. The injection of the MPAC includes forcing the MPAC into the flue duct via a dilute phase pneumatic injection system, like those used in municipal solid waste facilities. The commingled fly ash and MPAC exit the APCD (e.g., through an electrostatic precipitator, bag house) and collect on to a conveyor belt 40, which transports the mixture to the next processing station. Here, the magnetic particles are collected, for example, on an electromagnetic drum 50 similar to those used conventionally in coal processing/washing plants where they are used to collect magnetite that is added to the coal processing water to modify the water's density. When the electricity to the drum is interrupted, MPAC can be scraped from the drum using a blade towards a hopper whereby it can be recycled for reinjection, disposed, or processed to recover the sorbed mercury.

The invention will now be discussed in connection with certain experiments conducted in accordance with the present invention. The experiments are described in the following as well as in summary form in the following figures and tables.

Example 1

Preparation of Activated Carbon/Iron Composite

The production of a 1:1 composite sample would be made through the addition of 6 g of $FeCl_3$, 3 g of $FeSO_4$, and 9 g of activated carbon. The carbon and iron solutions are then mechanically mixed for at least 30 minutes. Afterwards, approximately 50 mL or thereabouts of NaOH (ca. 5 mol/L) is added drop wise to increase the pH to approximately 10, which precipitated the iron oxides. Afterwards, the sample is oven dried at 105° C. for 12 hours to decrease the total moisture content to less than 3%. The sample is then transferred to a desiccator and permitted to cool to room temperature.

Example 2

Preparation of Activated Carbon/Iron Composite with Photocatalyst

To 100 g of a 1:1 composite sample of activated carbon/iron composite prepared in accordance with Example 1 is added 1% by weight of titania (i.e., 1 mg) in accordance with the following procedure. 100 g of the 1:1 activated carbon/iron composite is added to 250 mL of deionized water and mechanically mixed for 60 s to disperse the composite in the fluid. Next, 1 g of Degussa P-25 $TiO_2$ is added and the suspension is continually stirred. After another 60 s, a hot plate is turned on to increase the temperature of the solution to 150° C. and this temperature is maintained until the majority of the water is evaporated. Next, the sample is transferred to a 105° C. gravity drying oven for 24 hours. The sample is then transferred to a desiccator and permitted to cool to room temperature.

Example 3

Removal of Hg

Figure 2:
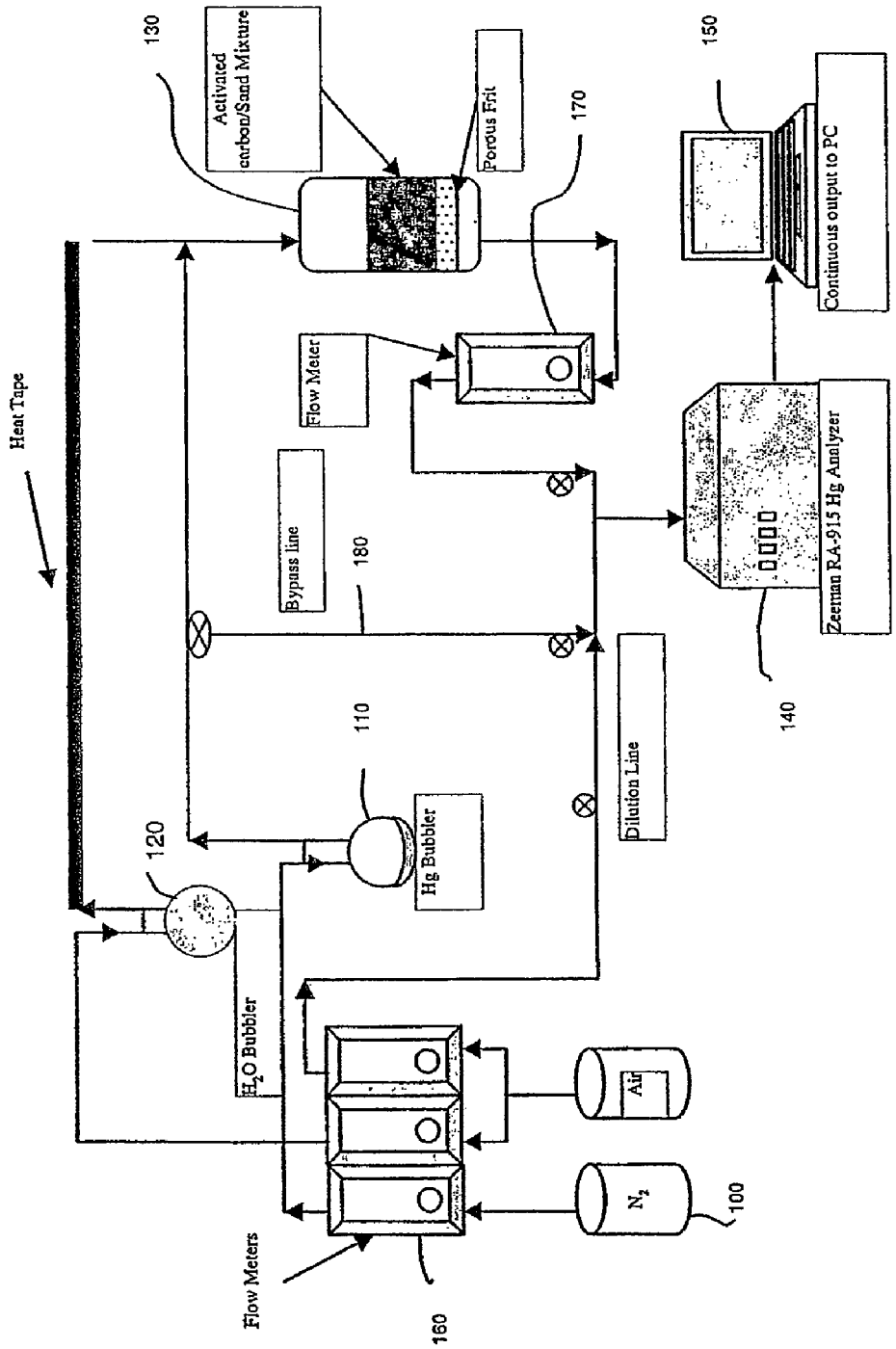
FIG. 2 represents a schematic of the test stand that was used to collect the data herein in accordance with the present invention.

Bench-scale studies were performed in the apparatus shown in FIG. 2, which consisted of a small column reactor whereby high grade nitrogen gas from reservoir 100 was passed through an elemental mercury reservoir 110 to create a mercury vapor laden air with less than 45 ppb of Hg. The mercury vapor was joined with a heated water vapor line (70% RH, 275° F.) from $H_2O$ bubbler 120 and the combination was flowed downward through the packed bed glass column from the top to minimize channeling or selective flow through the column. The parameters of the column are summarized in Table 1 below. Prior to adsorption testing, approximately 1 g of MPAC was mixed with a 140×200 mesh sieved quartz sand (1/20 carbon to sand ratio) and then heated to the desired temperature (275° F.) for a minimum of 30 minutes. Breathing grade air was used as a dilution flow to lower the readings to an acceptable range for the Ra-915+Zeeman Mercury Spectrometer (Ohio Lumex) 140. The effluent stream from the column was passed through the mercury analyzer 140 and mercury breakthrough curves were generated by computer 150 for comparison of the composite PAC samples. It will be understood that appropriate flow meters 160 and 170, as well as bypass line 180 are provided to control and facilitate the transport of the various materials.

TABLE 1

| Carbon Column Design | |
|---|---|
| Parameter | Value |
| Length (inches) | 7.25 |
| Diameter (inches) | 1.0 |
| Volume (mL) | 93.3 |
| Volume of media (mL) | 19.3 |
| carbon/sand ratio (g) | 1/20 |
| Gas flow rate (L/min) | 0.32 |
| Gas temp. (° F.) | 275 |
| $H_2O$ (%) | 70 |
| Average influent mercury (ppb) | 45 |
| Residence time (s) | 3 |

Figure 3:
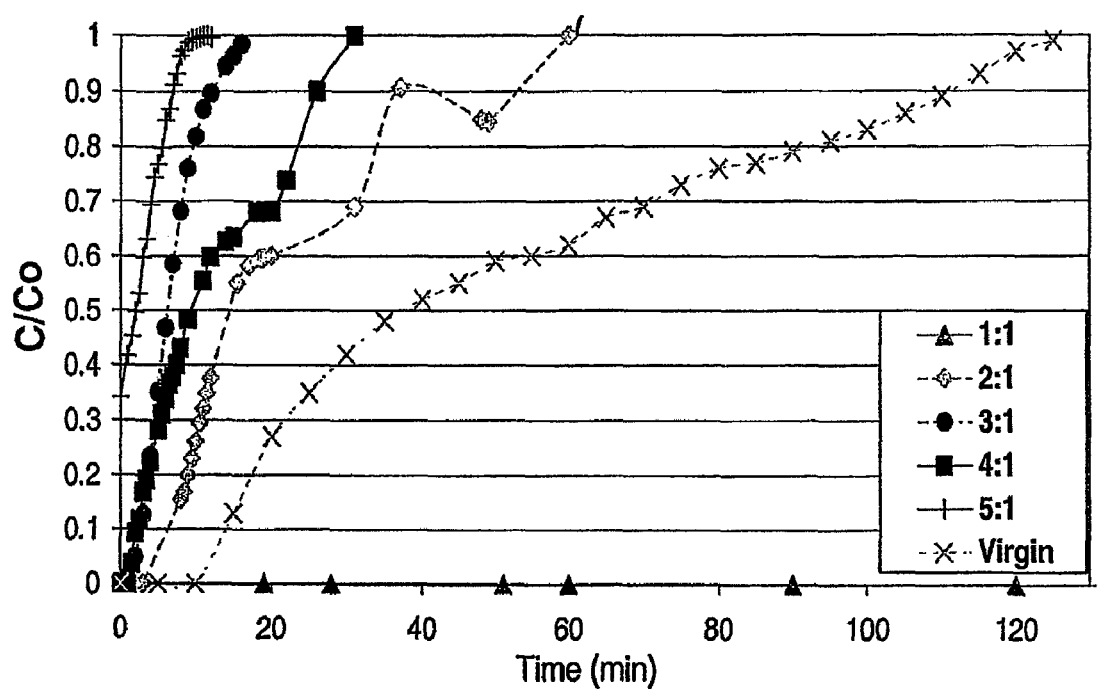
FIG. 3 represents a breakthrough curve highlighting several activated carbon magnetic composites and their performance for capturing Hg from flue gas in accordance with the present invention.

Beginning with a commercially available coal-based activated carbon, several magnetic carbon composites were produced via the method of Example 1 discussed above. These composites and their virgin counterpart were compared for their ability to remove elemental Hg. FIG. 3 demonstrates that a synergy exists when iron is loaded on to the carbon, for the 1:1 iron loaded carbon never experienced breakthrough (i.e., the effluent elemental Hg concentration never surpassed zero). The phenomena can be explained as the iron oxidizing the elemental Hg to its oxidized form (e.g., HgO), which not only sorbs better to activated carbon, but also serves as a sorbent for elemental Hg. (The 1:1 data was replicated seven times.) The 2:1 carbon performed about the same as the virgin carbon. This too is surprising since its surface area (Table 2) is about 3 times less than its virgin counterpart. Note that the 1:1 carbon also has a surface area about 2.5 times less than its virgin counterpart. The remaining data follows the same trend whereby the 3:1 out performs the 4:1 and the 5:1 composites for capturing Hg. The performance for the composites decreases as the ratio of carbon to iron increases because there is less iron present to catalyze the conversion (i.e., oxidation) of elemental mercury to oxidized mercury.

The BET surface areas for the carbon/iron composites were just discussed, and even though iron addition to the carbons severely decreased the carbons' surface area, performance for the 2:1 and 1:1 composites were equal to or better than the virgin carbon, respectively. The 1:1 composite had slightly more surface area than the 2:1 because the iron itself contributes to the total surface area of the composite, and there is more iron present with the 1:1 composite compared to the 2:1 sample. Table 2 below also lists the magnetic strengths for the composites. As the magnetic strength increases, the ease at which the composites are separated also increases. As shown, the virgin carbon was not magnetic at all. The composites followed the trend whereby the 1:1 carbon was the most magnetic (i.e., 109 milligauss) followed by the 2:1, 3:1, 4:1, and then the 5:1.

TABLE 2

| Carbon | BET Surface Area ($m^2/g$) | Magnetic Strength (mgauss) |
| --- | --- | --- |
| Virgin | 917 | 0 |
| 1:1 Carbon to Iron Ratio | 357 | 121 |
| 2:1 Carbon to Iron Ratio | 290 | 53 |
| 3:1 Carbon to Iron Ratio | 282 | 46 |
| 4:1 Carbon to Iron Ratio | 255 | 28 |
| 5:1 Carbon to Iron Ratio | 256 | 11 |

Figure 4:
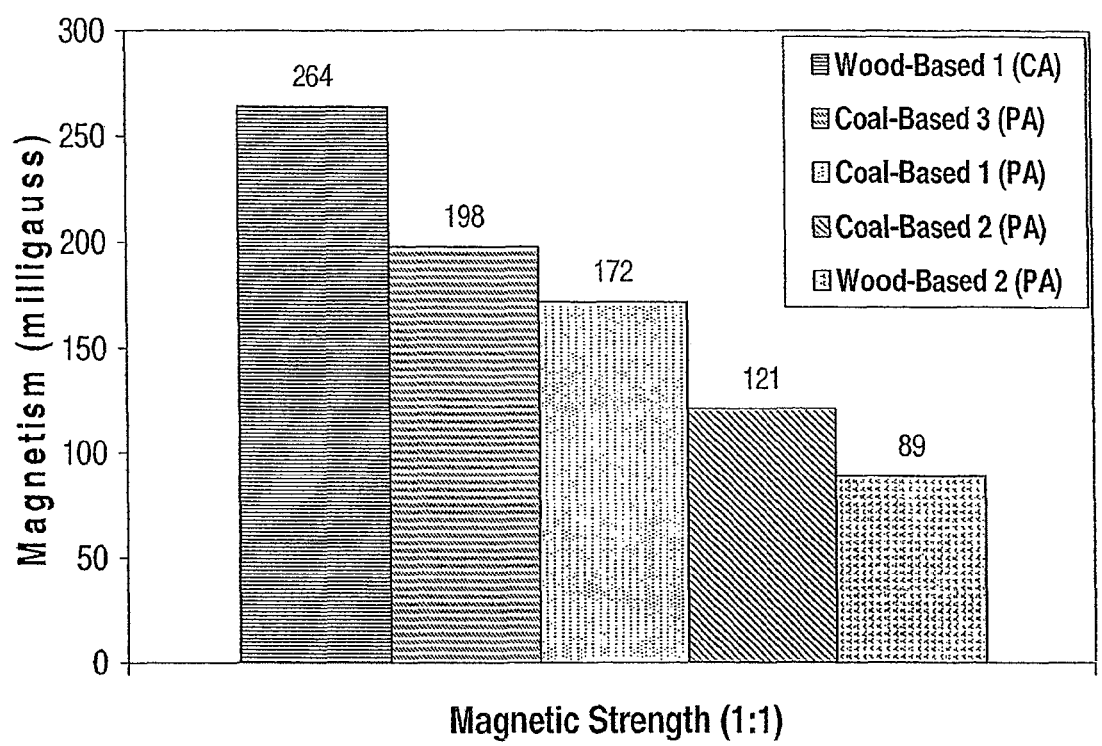
FIG. 4 represents a comparison of several activated carbon magnetic composites manufactured from different activated carbon precursors in accordance with the present invention.

Suitable activated carbon for use in the present invention is available commercially and FIG. 4 demonstrates that several commercially available carbons can be magnetized using a 1:1 ratio. Moreover, the degree of magnetization is different between the carbons. The commercially available carbon that was prepared with a chemical activation process was the most magnetic (264 milligauss), followed by the physically activated coal-based carbons (198, 172, and 121 milligauss), with the physically activated wood-based carbon being the least magnetic (89 milligauss). The suppliers of the carbons are Westvaco, Calgon, Carbochem, NORIT, and Acticarb.

Figure 5:
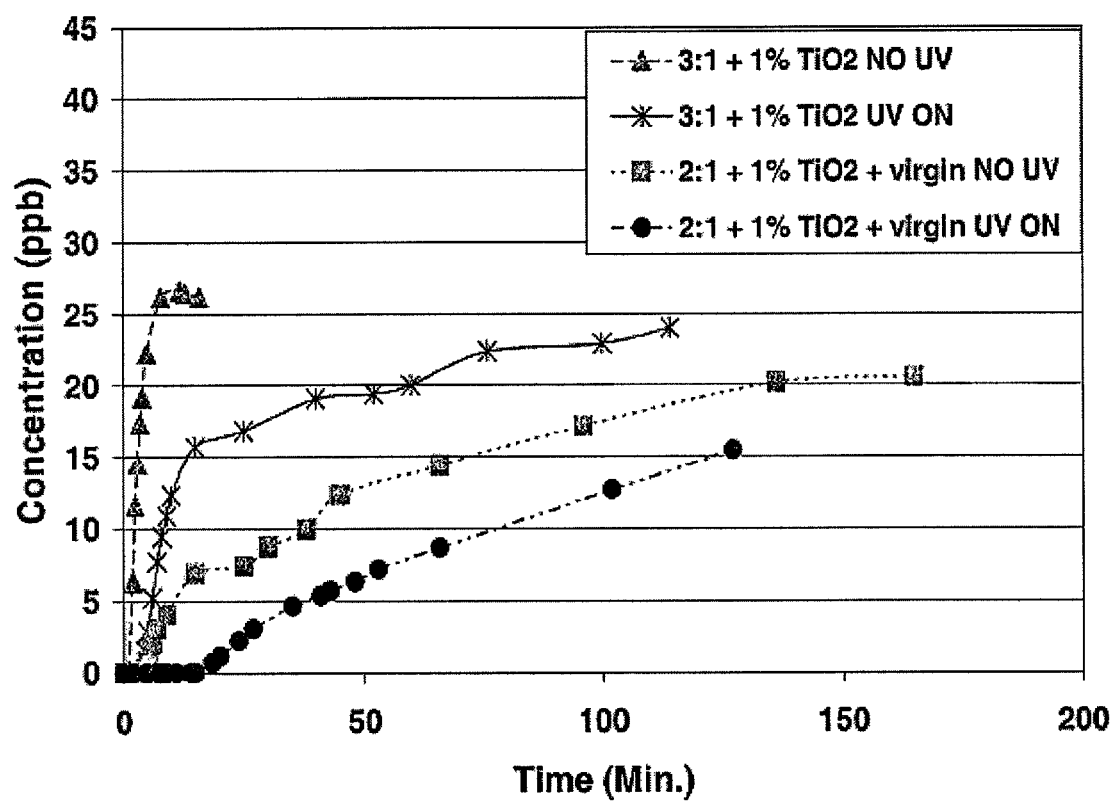
FIG. 5 represents a breakthrough curve highlighting the effect of $TiO_2$ addition to the magnetic composites for capturing Hg from flue gas in accordance with the present invention.

In accordance with the present invention, when $TiO_2$ is added to the magnetic carbon composite, elemental mercury can be oxidized so that it is more adsorbable when irradiated with UV light. FIG. 5 demonstrates that both the 3:1 and 2:1 composites exhibited better performance with the addition of 1% $TiO_2$ and UV irradiation. For example, the effluent concentration for the 2:1 composite with UV performed more than 2 times better than when the UV was absent. The titania was added to the MPAC via boil deposition by adding Degussa P-25 $TiO_2$ (1 wt %) to a beaker containing deionized water and the preferred mass of MPAC. The suspension was mechanically stirred at 105° C. until all of the water evaporated thereby implanting the titania to the carbon.

There are no other known inventions whereby activated carbons are magnetized and coated with a photocatalyst such as $TiO_2$ whereby the performance for mercury capture of the activated carbon improves after each cycle.

Coal-fired power plants are faced with stringent air emissions regulations, and PAC injection is currently the best available technology as deemed by the EPA. However, because it is expensive and contaminates the fly ash, a means to recycle the PAC can reduce operating costs while maintaining a salable fly ash. The invention described herein would facilitate these coal-fired power plants to meet regulations at a fraction of the projected costs.

Although the present application has been described in connection with the preferred embodiments thereof, many other variations and modifications will become apparent to those skilled in the art without departure from the scope of the invention.

What is claimed is:

1. A method for removing a contaminant from a fluid stream, comprising contacting the fluid stream with a composite of activated carbon and a magnetic material whereby the contaminant is adsorbed on the magnetized activated carbon, and removing the magnetized activated carbon having the contaminant adsorbed thereon from the fluid stream, wherein the magnetic material is implanted onto and in the pores of the activated carbon.

2. The method according to claim 1, wherein the contaminant is mercury.

3. The method according to claim 1, wherein the composite further comprises a photocatalyst and further comprising the steps of exposing the photocatalyst to excitation energy to provide hydroxyl radicals on the surface thereof.

4. The method according to claim 3, wherein the photocatalyst is $TiO_2$.

5. The method according to claim 3, wherein the photocatalyst is present in the composite in an amount of less than about 10% by weight based upon the total weight of the photocatalyst and composite of activated carbon and magnetic material.

6. The method according to claim 5, wherein the photocatalyst is present in the composite in an amount of less than about 7% by weight based upon the total weight of the photocatalyst and composite of activated carbon and magnetic material.

7. The method according to claim 6, wherein the photocatalyst is present in the composite in an amount of less than about 5% by weight based upon the total weight of the photocatalyst and composite of activated carbon and magnetic material.

8. The method according to claim 1, further comprising the step of recycling the magnetized activated carbon removed from the fluid stream back into contact with the fluid stream.

9. The method according to claim 1, wherein the fluid stream is flue gas from a combustion plant.

10. The method according to claim 9, wherein the combustion plant is a coal combustion plant or a waste combustion plant.

11. The method according to claim 1, wherein the activated carbon is injected into the fluid stream under pressure.

12. The method of claim 1, wherein the activated carbon is powdered activated carbon.

13. The method of claim 1, wherein the magnetic material is selected from the group consisting of magnetite, maghemite, hematite and goethite.

14. The method according to claim 1, wherein the composite contains activated carbon and magnetic material in a weight ratio of less than about 5:1.

15. The method according to claim 14, wherein the composite contains activated carbon and magnetic material in a weight ratio of less than about 4:1.

16. The method according to claim 14, wherein the composite contains carbon and magnetic material in a weight ratio of less than about 3:1.

17. A composite, comprising activated carbon and a magnetic material, wherein the magnetic material is implanted onto and in the pores of the activated carbon.

18. The composite according to claim 17, wherein the activated carbon is powdered activated carbon.

19. The composite according to claim 17, wherein the magnetic material is selected from the group consisting of magnetite, maghemite, hematite and goethite.

20. The composite according to claim 17, further comprising a photocatalyst.

21. The composite according to claim 20, wherein the photocatalyst is selected from the group consisting of $TiO_2$, ZnO and $SnO_2$.

22. The composite according to claim 21, wherein the photocatalyst is $TiO_2$.

23. The composite according to claim 20, wherein the photocatalyst is present in an amount of less than about 10% by weight based upon the total weight of the photocatalyst and composite of activated carbon and magnetic material.

24. The composite according to claim 23, wherein the photocatalyst is present in an amount less than about 7% by weight based upon the total weight of the photocatalyst and composite of activated carbon and magnetic material.

25. The composite according to claim 24, wherein the photocatalyst is present in an amount of less than about 5% by weight based upon the total weight of the photocatalyst and composite of activated carbon and magnetic material.

26. The composite according to claim 17, wherein the composite contains activated carbon and magnetic material in a weight ratio of less than about 5:1.

27. The composite according to claim 26, wherein the composite contains activated carbon and magnetic material in a weight ratio of less than about 4:1.

28. The composite according to claim 26, wherein the composite contains activated carbon and magnetic material in a weight ratio of less than about 3:1.

* * * * *